US006264025B1

United States Patent
Kennedy

(10) Patent No.: US 6,264,025 B1
(45) Date of Patent: Jul. 24, 2001

(54) COIN DISPLAY AND INDEXING METHOD

(75) Inventor: Karen Kennedy, Chanhassen, MN (US)

(73) Assignee: New York Mint, Ltd., Edina, MN (US)

( * ) Notice: Subject to any disclaimer, the term of this patent is extended or adjusted under 35 U.S.C. 154(b) by 0 days.

(21) Appl. No.: 09/654,790

(22) Filed: Sep. 5, 2000

(51) Int. Cl.[7] .................................................. A45C 1/00
(52) U.S. Cl. ........................ 206/0.84; D99/34; 206/457; 206/459.5; 434/150; 434/153
(58) Field of Search .................... D21/351, 480; D99/34; 206/0.8, 0.81–0.84, 445, 457, 459.5; 273/157 R; 434/146, 147, 150–153, 154

(56) References Cited

U.S. PATENT DOCUMENTS

| | | |
|---|---|---|
| 279,268 | 6/1883 | Norris . |
| D. 428,680 | 7/2000 | Hildebrand et al. . |
| 650,320 * | 5/1900 | Hepfinger .............................. 434/150 |
| 730,859 * | 6/1903 | Austin .................................... 434/150 |
| 2,139,150 | 12/1938 | Curtis et al. . |
| 3,749,404 | 7/1973 | Oetzel . |
| 4,063,639 | 12/1977 | Grant . |
| 4,194,305 * | 3/1980 | Smith et al. ......................... 434/150 |
| 5,259,763 | 11/1993 | Wendel et al. . |
| 5,549,332 | 8/1996 | Judson . |
| 5,772,441 | 6/1998 | Wilson . |
| 5,988,366 | 11/1999 | Krull et al. . |
| 6,032,790 | 3/2000 | Soutchkov et al. . |

* cited by examiner

Primary Examiner—Jim Foster
(74) Attorney, Agent, or Firm—Haugen Law Firm PLLP

(57) ABSTRACT

A device is provided in the form of a map of the United States to display a set of commemorative coins in relation to state geographic regions associated with the coins. A color-coded indexing system is set forth in a chart which associates the date of issuance of the coins, the chronology of issuance according to order of statehood, and the geographic state region represented by the coin.

11 Claims, 3 Drawing Sheets

From 1999-2008, each of the 50 states will be honored on a unique commemorative Quarter Dollar coin. Five different coin designs will be issued each year, and they will be released in the order in which the states joined the union. The reverse of each coin symbolizes the states's history or culture.

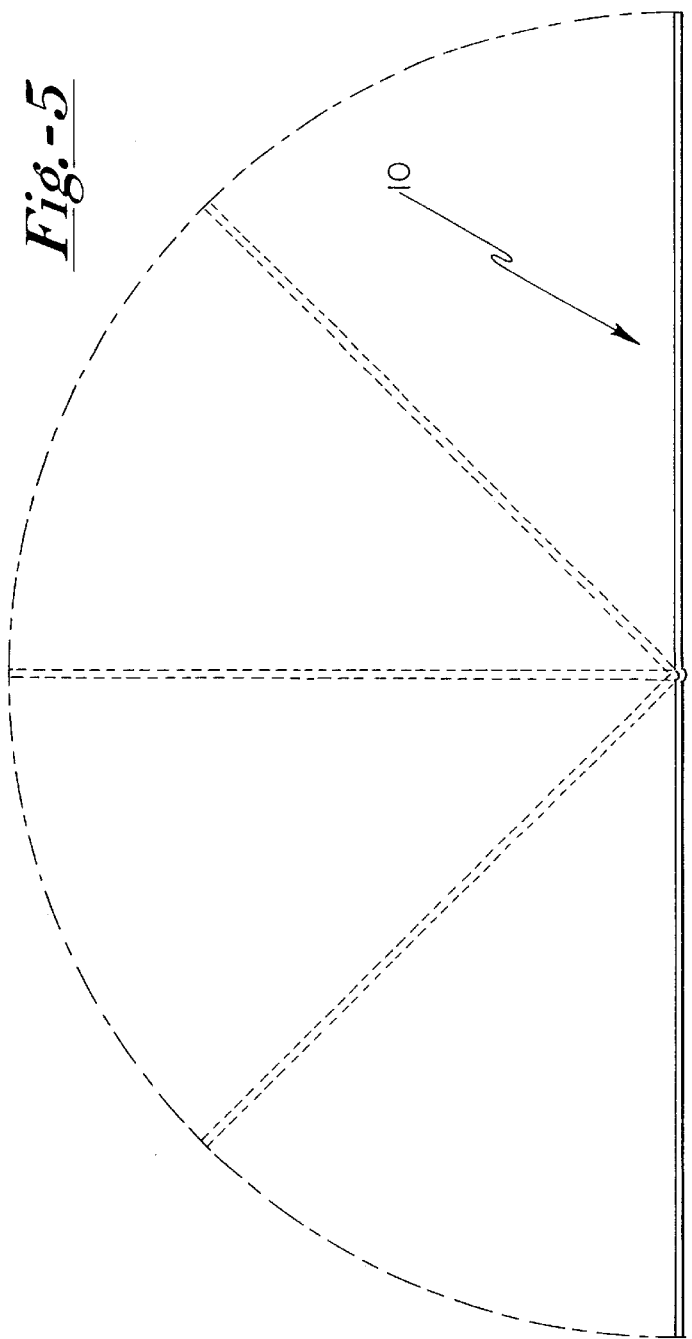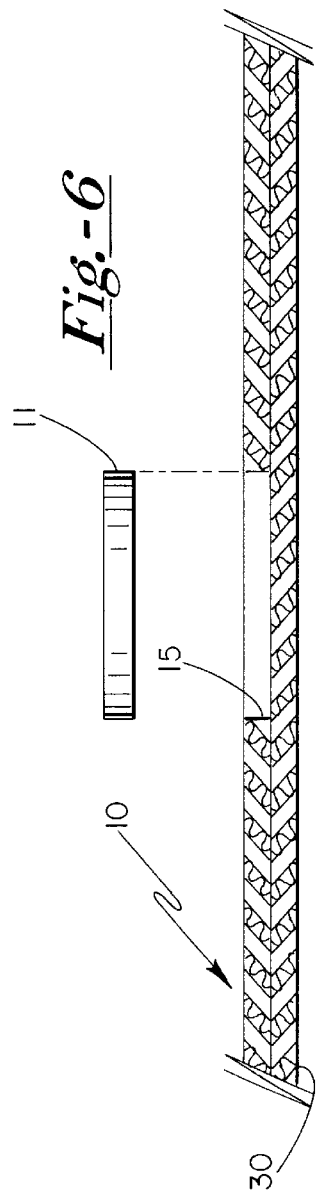

COIN DISPLAY AND INDEXING METHOD

FIELD OF INVENTION

The present invention relates to a device for displaying and storing a set of commemorative coins, each one of which relates to a specific state of the United States, and more particularly, to a method for indexing the coins in relation to the order and date of minting and to the particular state with each is associated.

BACKGROUND OF THE INVENTION

Collectors typically display their rare and/or more valuable coin sets in containers or individual cardboard or plastic holders which are designed to provide storage, facilitate indexing, and permit viewing. A labeling system utilizing printed characters placed in proximity to a pre-sized opening which holds a particular coin is often employed to designate the year or geographic location of the facility in which each coin was minted. However, these display and indexing systems are generally all-purpose, and do not illustrate or depict any characteristics which are unique to a particular coin within a given set or collection. One particular arrangement in the prior art provides a system for displaying a set of coins in relation to a depiction of geographic regions with which they are associated, but lacks an indexing mechanism for easily and attractively determining the chronology of issuance of each particular coin.

SUMMARY OF THE INVENTION

An object of the present invention is to provide a commemorative coin display device comprising a map and associated charts, which may be utilized for storage as well as educational value.

Another object is to provide a commemorative coin display device having an integral color-coded indexing system which easily visually corresponds the date of issuance of the coin with the chronology of issuance being according to statehood, and with a related geographic region and/or state.

DESCRIPTION OF THE DRAWINGS

For a more thorough understanding of the invention refer now to the following detailed description and drawings in which:

FIG. 5 is an end view of the device folded on itself about the central axis.

FIG. 6 is a fragmentary sectional view taken through the diameter of one of the coin recesses.

DETAILED DESCRIPTION OF THE PREFERRED EMBODIMENT

The present invention provides a device for displaying and storing a specific set of commemorative coins in relation to certain geographic areas, regions, and states associated with the coins. In addition, an indexing scheme is presented which provides an easily discernable color-coded recognition of the association between the year of issuance of the coins, and order of statehood of the geographic regions associated with the coins.

Figure 1:
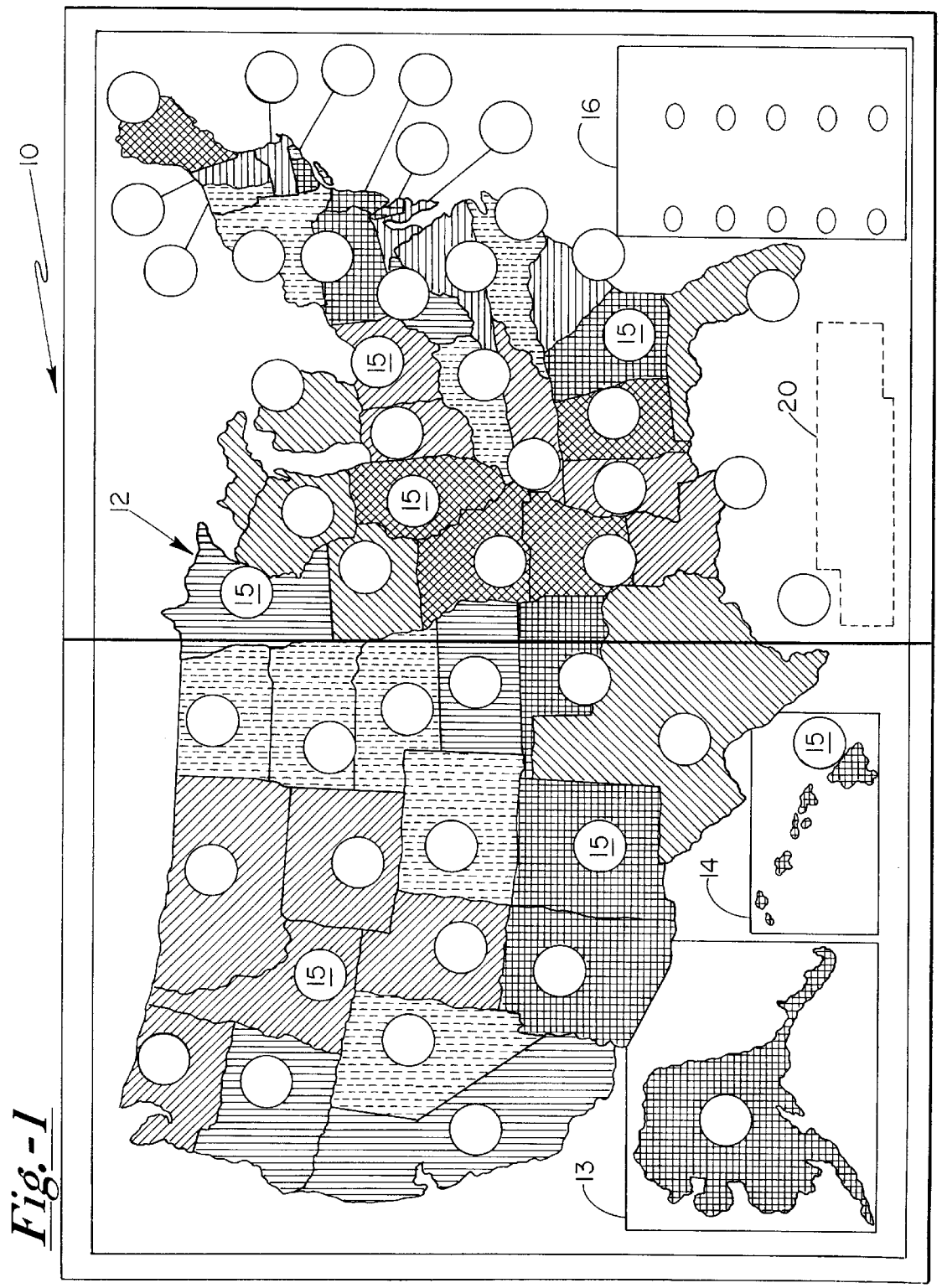
FIG. 1 is a top plan view of the coin display and indexing device according to the principles of the present invention.

Referring to FIG. 1, the device includes a rectangular board 10 having a generally flat configuration and fashioned from cardboard, plastic pad, or some other suitable supporting material. The board 10 displays a map 12 of the United States, divided into forty-eight state geographical regions. The state regions of Alaska and Hawaii are included as insets 13 and 14. A recessed circular opening 15 is provided in the board 10 for each of the fifty state regions. Each opening is configured to receive a quarter-dollar sized coin. The coins may be secured in the recessed openings by press-fitting.

The map face is accompanied by a color code chart 16 which serves as an indexing device to color-code the state geographic regions with the date of minting of the commemorative quarter-dollar coins. The chart 16 also lists the order in which each state joined the Union, and categorizes each with a release date year.

Figure 2:
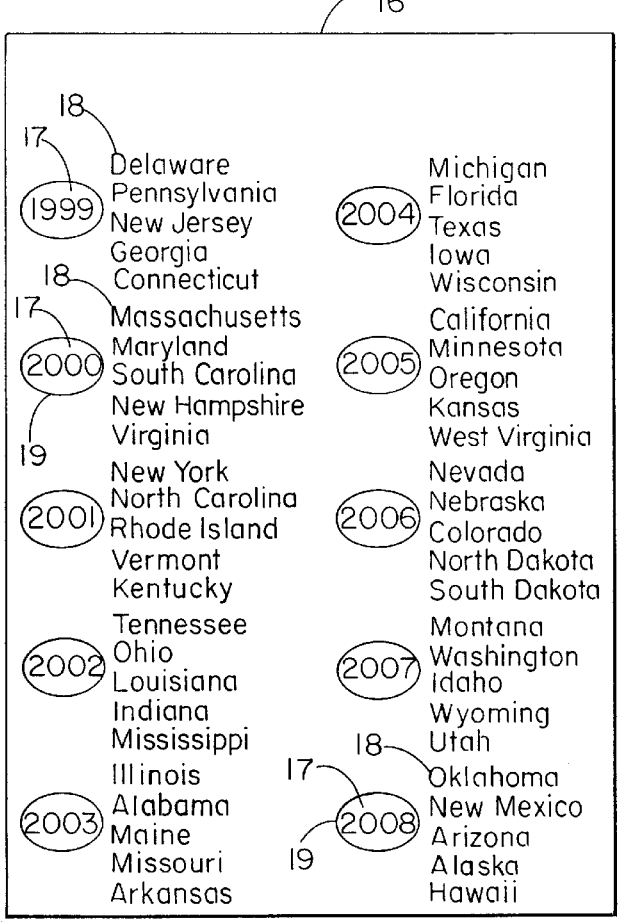
FIG. 2 is a detailed typical legend illustrating the color-coding relationship among the date of issuance, chronology of statehood, and geographic region.
Figure 3:
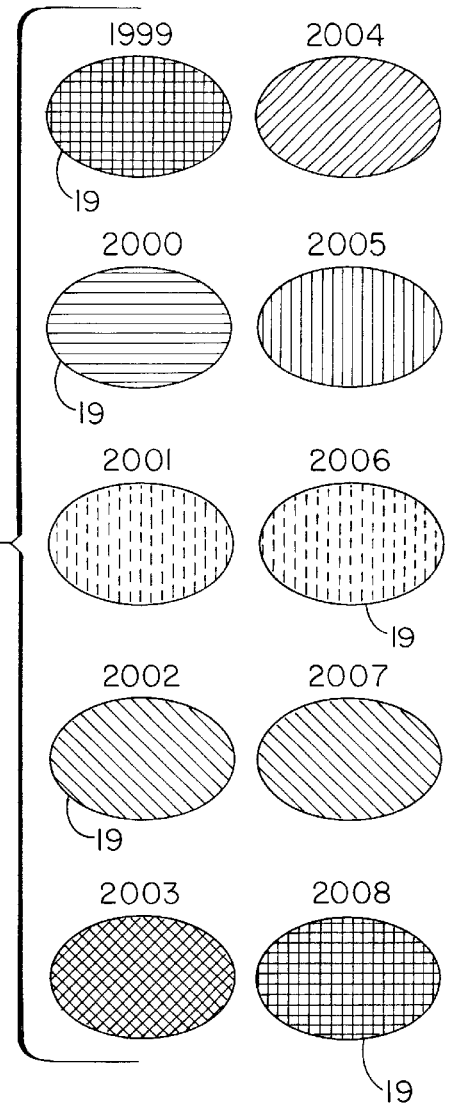
FIG. 3 is a detailed color code chart means of typical colors representing the specific color designations for each year of issuance.

FIG. 2 shows a detailed view of the color code or indexing chart 16. Each of the years 1999 through 2008 as at 17 is associated with the release of a quarter-dollar coin from a specified state 18. Each year is assigned a color 19, with the color being reproduced in the corresponding state geographic area as displayed on the map 12. FIG. 3 displays a further detailed view of the color code chart 16, specifying typical colors used to distinguish the year of issuance of the quarter-dollars.

Figure 4:
FIG. 4 is a detailed typical legend illustrating the rationale of coin issuance.

FIG. 4 displays a typical legend 20, detailing the conditions of issuance of the commemorative quarter-dollar coins. The legend provides a written rationale and reference which connects the years of issuance with the order of release according to when a state joined the Union.

FIG. 5 illustrates the rectangular board 10 as being folded upon itself about the central axis, for ease of storage.

FIG. 6 shows a cross-sectional view of the board 10 taken through the diameter of a recessed coin opening 15. A flexible backing material 30 may be mounted to the underside of the board 10 to aid in maintaining the position of the coin 11 in the opening 15.

The above has been given only by way of illustrative example of the present invention and all such modifications and variations that would be apparent to persons skilled in the art are deemed to fall within the broad scope of this invention as defined in the claims.

What is claimed is:

1. A coin display and indexing device comprising:
    a support;
        a color-coded map on the surface of said support and being divided into geographical
        regions constituting the United States of America, each said region being
        designated by a distinguishing color such that discrete groups of said geographical regions have like colors, each of said colors being indexed to indicate a particular time period,
        wherein said time period also corresponds to the chronology of statehood, and;
    a plurality of openings each being adapted to retain a coin therein, each opening
        associated with a selected one of said geographical regions.
2. The coin display of claim 1, wherein an enlarged portion of the map represents regions removed from their actual geographic location.

3. The coin display of claim 1, wherein said support is cardboard, the support being foldable about a central axis.

4. The coin display of claim 1, wherein the plurality of openings are circular.

5. The coin display of claim 3, wherein each said opening consists of a cylindrical recess in the support.

6. The coin display of claim 3, wherein each opening is designed to accommodate a quarter dollar coin.

7. The coin display of claim 3, wherein each opening is associated with a particular geographic region.

8. The coin display of claim 1, wherein each distinguishing color represents a date of issuance of the coin by a United States mint.

9. The coin display of claim 7, wherein a date of issuance is indicated as a numbered year.

10. The coin display of claim 7, wherein a date of issuance corresponds to the sequential order of statehood of each geographic region.

11. The coin display of claim 1, including an indexing chart correlating said colors to respective said time periods and to respective said regions.

* * * * *